US005176075A

United States Patent [19]

Vegue

[11] Patent Number: 5,176,075

[45] Date of Patent: Jan. 5, 1993

[54] MACHINES FOR HANDLING OR WORKING MATERIALS IN LAMINAR OR SHEET FORM

[75] Inventor: Daniel G. Vegue, Barcelona, Spain

[73] Assignee: Iberica A.G., S.A., Spain

[21] Appl. No.: 706,638

[22] Filed: May 29, 1991

Related U.S. Application Data

[63] Continuation of Ser. No. 447,267, Dec. 7, 1989.

[30] Foreign Application Priority Data

Feb. 16, 1989 [ES] Spain .................................. 8900906

[51] Int. Cl.[5] .......................... B30B 1/06; B30B 1/10; F16H 21/14

[52] U.S. Cl. .................................... 100/282; 100/286; 74/69

[58] Field of Search ............... 100/282, 283, 286, 285; 74/69

[56] References Cited

U.S. PATENT DOCUMENTS

| | | | |
|---|---|---|---|
| 307,214 | 10/1884 | Monell | 74/69 |
| 755,083 | 3/1904 | Vandewerker | 74/69 |
| 1,172,936 | 2/1916 | Burn | 74/69 |
| 2,447,839 | 8/1948 | Bingley | 74/69 |
| 2,507,556 | 5/1950 | Bobst | 164/102 |
| 3,182,588 | 5/1965 | Bolliger | 100/286 |
| 4,013,003 | 3/1977 | Finsterwalder et al. | 100/285 |
| 4,276,823 | 7/1981 | Rotzler | 100/282 |

FOREIGN PATENT DOCUMENTS

| | | |
|---|---|---|
| 327443 | 1/1968 | Spain . |
| 434648 | 2/1975 | Spain . |
| 521461 | 4/1983 | Spain . |
| 211933 | 10/1941 | Switzerland . |
| 245082 | 7/1947 | Switzerland . |
| 349137 | 11/1960 | Switzerland . |

*Primary Examiner*—Paul T. Sewell
*Assistant Examiner*—M. D. Patterson
*Attorney, Agent, or Firm*—Steinberg & Raskin

[57] ABSTRACT

A control mechanism for driving a movable lower platen in a platen press or similar machine including a fixed upper platen, the movable lower platen adapted for movement towards and away from the fixed upper platen, the machine also including a plurality of nipper bars adapted for movement between the platens to remove sheet material from between the platens. The control mechanism includes a crankshaft, a plurality of cranked levers articulated to the movable lower platen, a plurality of connecting rods, each of the connecting rods articulated to the crankshaft and articulated to one of the cranked levers, and a wheel having a groove therein on a side of the wheel facing the crankshaft in which a tenon or finger moves to change the speed of movement of the crankshaft and hence the movement of the lower platen.

2 Claims, 3 Drawing Sheets

MACHINES FOR HANDLING OR WORKING MATERIALS IN LAMINAR OR SHEET FORM

This is a continuation of application Ser. No. 07/447,267, filed Dec. 7, 1989.

The present invention relates to improvements applicable to machines intended for handling or working materials in laminar or sheet form.

BACKGROUND OF THE INVENTION

There are known in the art machines for handling sheet materials and comprising means for the displacement of the nipper bars fastening the sheet materials, a movable lower platen and a fixed upper platen, the sheet materials being fed between them, and a movable platen control mechanism.

There are diverse control mechanisms for said movable platen.

In one of the known control mechanisms described in Swiss Patent No. 245082operation of the movable platen is performed by means of a crankshaft which is driven at a constant speed and acts through connecting rods upon an ensemble of cranked levers.

According to another mechanism described in Spanish Patent 521461 , operation of the lower platen is performed by means of direct drive cams upon an ensemble of cranked levers. This device uses cams mounted on a shaft placed between the several groups of cranked levers. In this embodiment, the movement generated by the cams is transmitted to the groups of cranked levers by means of a rolling member provided in said groups of cranked levers and which follows the cam outlines, providing for adjustment of the conditions of stroke, speed and acceleration of the lower platen movement.

This device has, however, the drawback that it must be provided with mechanisms ensuring always the contact of the rolling member with the cam, which increases its complexity and makes assembly of the device difficult.

A specific prior art apparatus, disclosed in Spanish Patent Application 88 00844 of the applicant in the instant application, comprises a movable platen control mechanism in which the central joints of the crank levers are horizontally moved by a crankshaft driven by a revolving shaft receiving driving movement from a worm-and-wheel mechanism and rocking drive means.

This rocking drive means comprises a rack segment rotating on an axle coupled to a wheel at a given distance from the rotating wheel axle and a sprocket coupled to the wheel axle. The rack segment has a pin forced to run along a groove in such a way that every turn of the wheel causes a reciprocatory motion in the rack segment which turns into a rocking motion in the sprocket and in the crankshaft.

Owing to this rocking drive means, when the worm mechanism revolves at a constant speed the crankshaft does so at a variable speed which is slower at the lower position of the platen and faster at the upper position adjacent to the fixed upper platen, thus facilitating the synchronized passing of the nipper bars between the platens.

In this way, the movement of the lower platen adapts to the movement of the sheet feeder element at every working cycle of the press. Said sheet feeder element consists of nipper carrying bars. In these bars, the pressure surface for the nippers is located, to improve the aerodynamic behavior of the bars, between the upper and the lower planes of the bars.

SUMMARY OF THE INVENTION

An object of the present invention is to provide a means for a rocking drive mechanism, dispensing with the need for a coupled to the wheel axle.

The present invention is characterized in that the rocking drive means comprises means for transmitting the motion from the wheel to the crankshaft and in the offset arrangement of the crankshaft axis as regards the wheel axis.

According to a preferred embodiment of the invention, the means for transmitting the motion from the wheel to the crankshaft comprises a drawing finger arranged at one end of the crankshaft and offset as regards the axis thereof, and a groove formed at the contiguous side surface of the wheel, said finger being housed therein.

In this way, when the wheel rotates at a constant speed, the crankshaft is drawn at a variable speed because it is coupled off center. During the movement, the crankshaft drawing finger perform a cyclic motion along the wheel groove.

Advantageously, said drawing groove and finger are endowed with sliding and rolling means making easier its displacement and oscillation.

According to another embodiment of the invention, the means for transmitting the motion from the wheel to the crankshaft comprises one or several levers joined through connecting rods.

BRIEF DESCRIPTION OF THE DRAWINGS

For a better understanding of the above disclosure, some diagrammatic drawings are enclosed showing only by way of nonrestrictive example, a practical case of embodiment. In said drawings.

DESCRIPTION OF THE PREFERRED EMBODIMENTS

Figure 1:
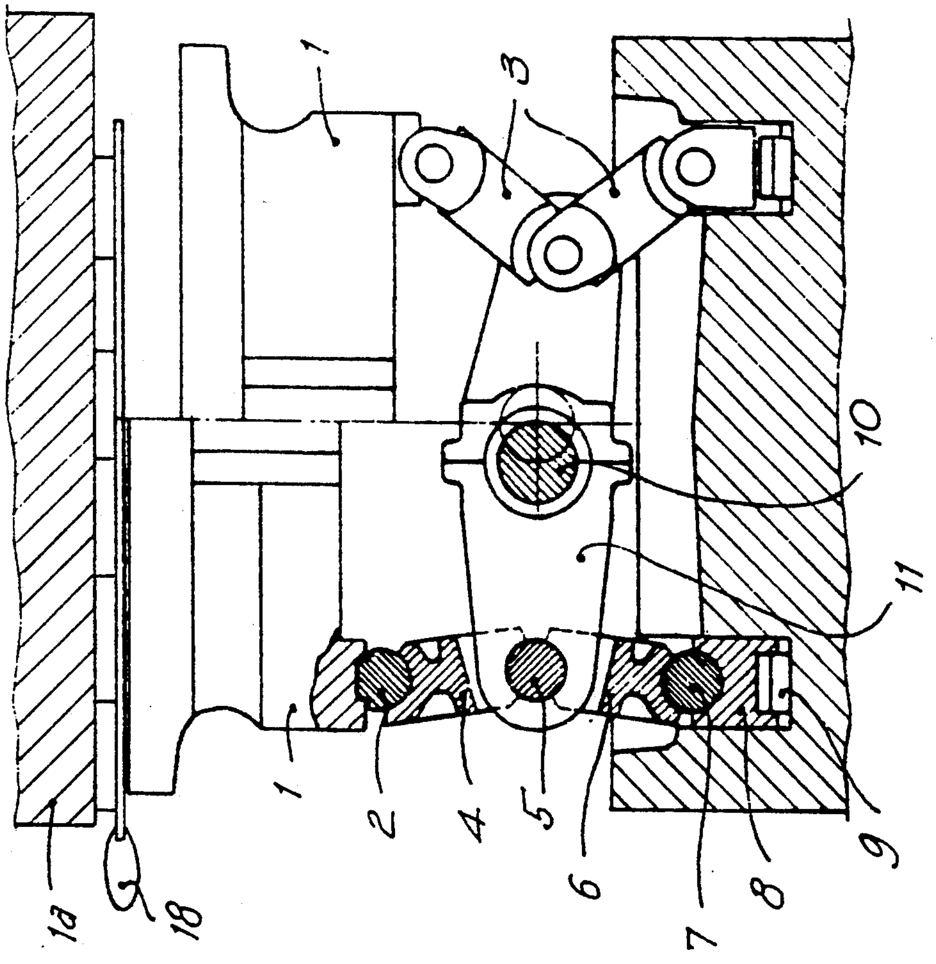
FIG. 1 is a partly cut away elevational view of a platen press endowed with the improvements of the invention.

FIG. 1 shows the device for drawing the lower platen in a conventional platen press. The lower platen 1 carries semicylindrical articulations 2 secured at its lower part, only two of which are shown in the Figure. Each said semicylindrical articulations 2 serves as an upper seat for the cranked levers 3.

The cranked levers 3 are formed of an upper arm 4 having secured thereto a cylindrical articulation 5 at its lower part, and a lower arm 6 having another cylindric articulation 7 secured at its lower part. The cranked levers 3 rest at their lower part an a support 8 resting upon tapered wedges 9. The crankshaft 10 transmits, in its uninterrupted rotation movement, back and forth horizontal movement to the cranked levers 3 by means of the connecting rods 11, and drive vertically the lower platen 1 in an up and down movement.

Figure 2:
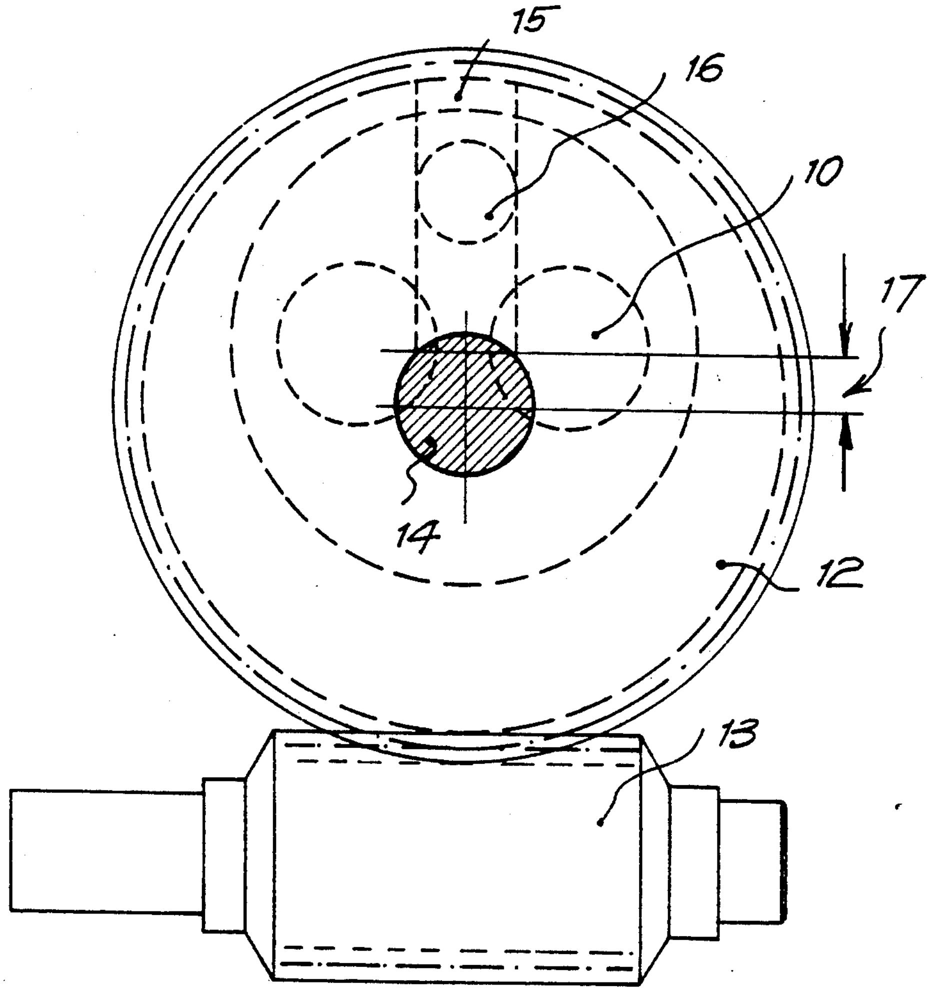
FIG. 2 is a front elevational view of the control mechanism for the movable platen.

FIG. 2 shows the control mechanism for the variable movement of the crankshaft 10, and is formed, essentially, of a wheel 12 which is driven by a worm 13.

Figure 3:
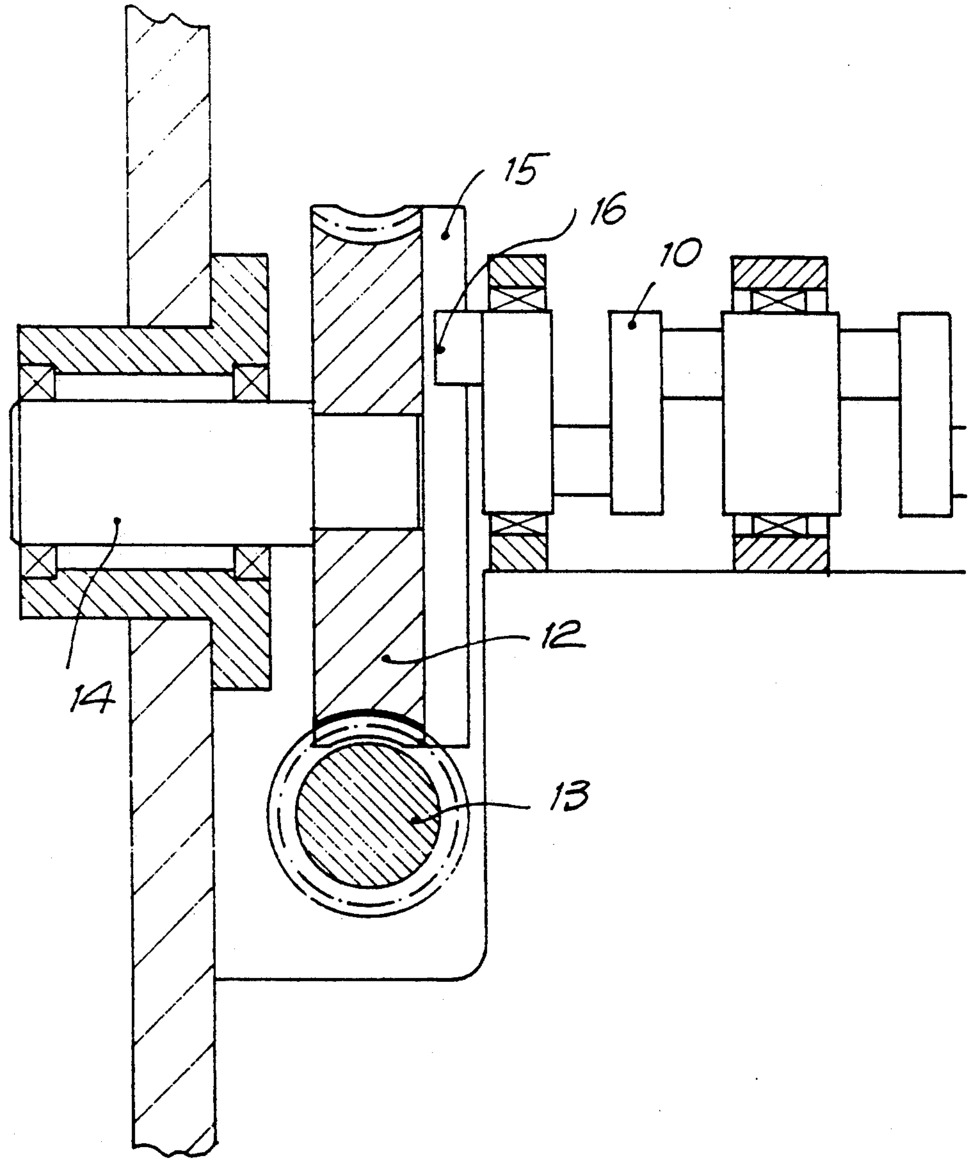
FIG. 3 is a longitudinal section of the mechanism of FIG. 2.

As shown in FIG. 3, the wheel is mounted on a revolving shaft 14 and has a longitudinal groove 15 housing the tenon or finger 16 of the crankshaft 10.

The wheel 12 makes a turn for each working cycle of the press and draws the crankshaft 10 such that it also makes one turn at every working cycle, though it increases and diminishes its rotation speed according to the distance 17 between the rotation axis of wheel 12 and the rotation axis of the crankshaft 10. Thus the crankshaft speed is variable being lower when the plates 1, 1_a_ approach each other and higher when they separate. If the distance 17 between the respective rotational axes of wheel 12 and crankshaft 10 increases the highest speed of the crankshaft also increases.

In this way, the movement of the lower platen 1 can be adjusted to the movement of the nipper bars 18 for the sheets (FIG. 1) at every working cycle of the press. A feeder element consists of nipper carrying bars in which the pressure surface for the nippers is located, between the upper and the lower planes of the nipper bars 18 (FIG. 1).

As will be understood, the real speeding up and slowing down of the rotation of the crankshaft 10—and thus of the traveling of the movable platen 1—is the resultant of the drag that the wheel 12 performs, during its rotation, upon the tenon or finger 16 of the crankshaft 10.

It is obvious that many details of the described mechanism can be changed without departing thereby from the scope of the invention. Thus, for example, the tenon 16 of the crankshaft could have a slider, a roller, or the like. The groove 15 of the wheel 12 could be on the shaft 14 supporting this latter, either in an integral arrangement or as an insert. Also, the drawing elements could be in the inverse positions, that is to say, the crankshaft 10 could be formed with a groove, and the wheel 12, or the shaft 14 thereof, of a drawing finger, tenon, slider, roller, or the like.

Another form of drawing would be obtained by replacing the groove and the finger by levers and connecting rods joined to the wheel 12 and crankshaft 10 and giving raise, owing to the offset position of their centers 17, to a cyclic, variable movement staring from a constant movement.

Also, conventional damping means could be foreseen for absorbing the kinetic energy produced by the driving system of the press.

It will be thus understood that the materials, shapes and measurements of the ancillary mechanisms, organs or devices compounding the subject of the invention, the machines to which the same are applied, and generally all of the accessory details that might come in account, will be independent of the scope of the invention in the proviso that they do not depart from the essentials of the same.

I claim:

1. A platen press comprising a fixed upper platen;

a movable lower platen adapted for movement towards and away from said fixed upper platen;

a feeder element comprising a plurality of nipper bars adapted for movement between said platens to remove sheet materials from between said platens;

a crankshaft;

a plurality of cranked levers articulated to said movable lower platen;

a plurality of connected rods, each of said connecting rods respectively articulated to said crankshaft and articulated to one of the said cranked levers; and means for cyclically driving said crankshaft at variable speed, said means comprising a wheel adjacent to one end of said crankshaft, said wheel rotating about an axis parallel to the axis of said crankshaft, said wheel having a radial guide on a side of said wheel facing said one end of said crankshaft, a follower member connected to said one end of said crankshaft and slidably meshing with said radial guide of said wheel, the interaction between said radial guide on said wheel and said follower member producing a variable drag therebetween which, as it varies, changes the speed of rotation of said crankshaft which in turn drives said movable lower platen at variable speeds in an up and down movement by means of said plurality of connecting rods and said plurality of cranked levers, said crankshaft connected to said movable lower platen such that when said movable platen is closest to said fixed platen and said follower member is in its radially outermost position in said radial guide, said movable platen moves relatively faster than when said movable platen is farthest from said fixed platen and said follower member is in its radially innermost position, and during each rotation of said crankshaft about its axis, for about 270° of said rotation said movable and said fixed platens are apart, and for about 90° of said rotation said movable and said fixed platens contact each other, the movement of said movable lower platen being adjustable to the movement of said feeder element.

2. The platen press of claim 1, wherein said radial guide is a groove in said side wheel facing said one end of said crankshaft, and said follower member is a tenon or finger protruding from said one end of said crankshaft.

* * * * *